J. H. CASTONA.
PROCESS OF EXTRACTING TURPENTINE AND ROSIN FROM WOOD.
APPLICATION FILED OCT. 8, 1912.
1,111,644.
Patented Sept. 22, 1914.
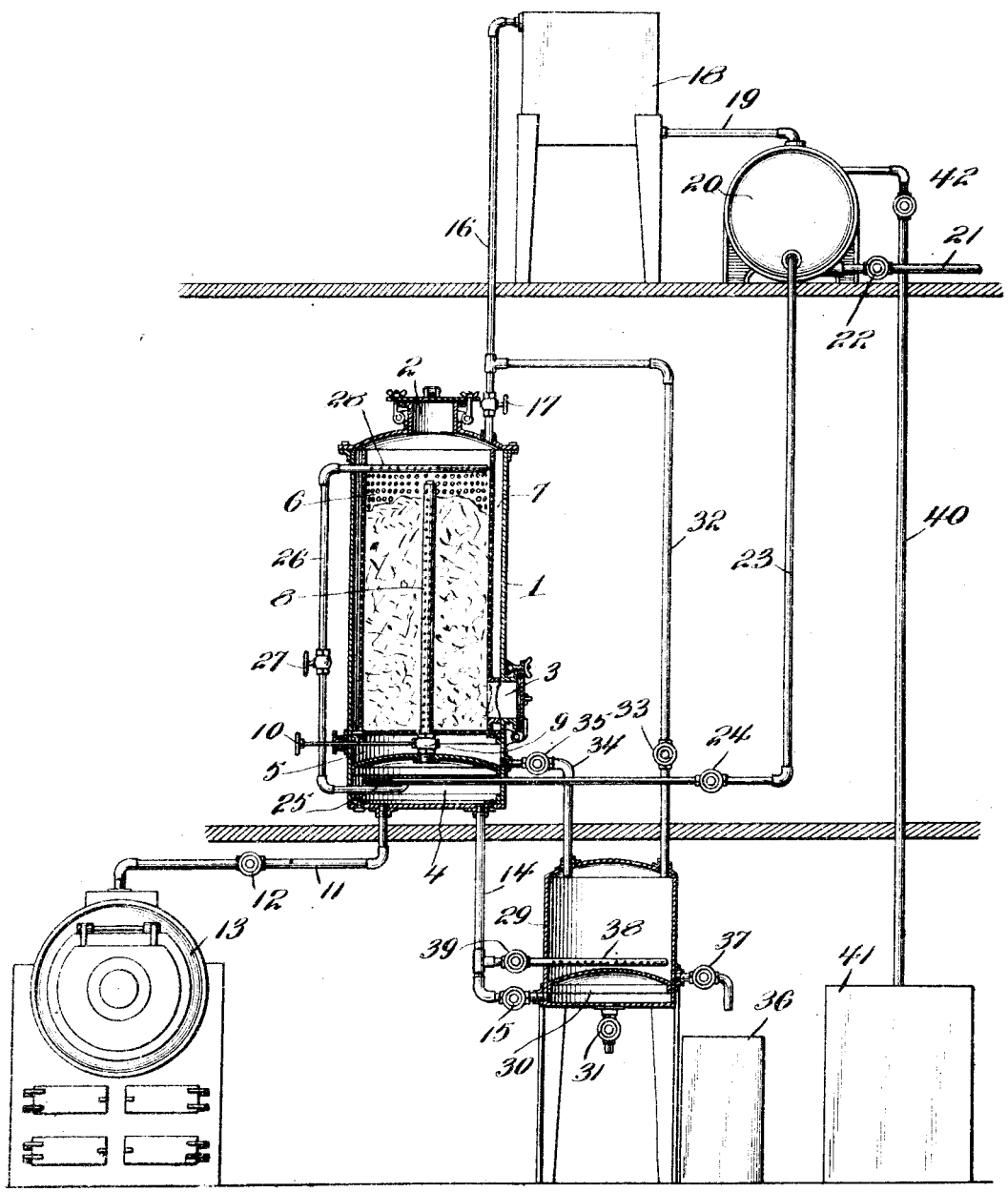
Inventor
John H. Castona
Witnesses
J. L. Wright
C. C. Hines
By Victor J. Evans,
Attorney

UNITED STATES PATENT OFFICE.

JOHN H. CASTONA, OF GULFPORT, MISSISSIPPI.

PROCESS OF EXTRACTING TURPENTINE AND ROSIN FROM WOOD.

1,111,644.  Specification of Letters Patent.  Patented Sept. 22, 1914.

Application filed October 8, 1912. Serial No. 724,631.

*To all whom it may concern:*

Be it known that I, JOHN H. CASTONA, a citizen of the United States, residing at Gulfport, in the county of Harrison and State of Mississippi, have invented new and useful Improvements in Processes of Extracting Turpentine and Rosin from Wood, of which the following is a specification.

This invention relates to a process of extracting turpentine and rosin from wood, the primary object of the invention being to provide a process whereby the turpentine may be used as a solvent for the extraction of the rosin, thus obviating the objections to the use of hydro-carbons and other foreign substances.

A further object of the invention is to provide a process of extracting turpentine and rosin, whereby high grade products may be obtained at a minimum cost.

The accompanying drawing shows a sectional elevation of one form of apparatus which may be employed for carrying the process into practical effect.

In the drawing, 1 designates an extractor having a suitably closed inlet 2 for the introduction of the comminuted wood and a suitably closed outlet 3 for the withdrawal of the refuse wood at the completion of the extracting operation. This extractor is provided with a heating chamber 4 in its base and a rosin collection space or chamber 5 above said heating chamber.

Disposed within the extractor is a perforated cage or basket 6 to contain the charge of comminuted wood, said cage or basket terminating above the chamber 5 and being arranged in spaced relation to the extractor to provide a surrounding space 7 for the discharge of the volatile products. Communicating at its lower end with the heating chamber 4 is a perforated pipe 8 extending centrally within the cage, whereby steam may be introduced for circulation throughout the mass of wood to heat the same for the separation of the volatile products therefrom. A valve 9 having an exteriorly projecting stem 10 is provided for controlling the supply of steam to said pipe 8 from the chamber 4.

The chamber 4 is supplied with steam through a pipe 11 having a valve 12 from a boiler or steam generator 13, and a pipe 14 having a controlling valve 15 is provided for the discharge of the water of condensation from the chamber 4 and to regulate the discharge of steam therefrom to maintain a circulation and predetermined degree of heat therein.

The volatile constituents liberated from the wood, and the vaporized solvent used in the extracting operation, pass from the extractor through a pipe 16 having a controlling valve 17 to a suitable condenser 18, from which the liquefied vapors and water of condensation from the steam discharge through a pipe 19 into a suitable turpentine storage tank or reservoir 20.

The tank 20 is provided with a pipe 21 having a controlling valve 22 for the separation of the water of condensation from the turpentine, and has leading therefrom a pipe 23 provided with a controlling valve 24. This pipe 23 communicates with a heating coil 25 arranged in the chamber 4, which coil is connected by a pipe 26 having a controlling valve 27 with a perforated solvent injection coil or spray coil 28 located in the top of the cage 6.

Arranged below the level of the extractor is a still 29 provided in its bottom with a heating chamber 30 connected with the pipe 14 and provided with a valved drain pipe 31 for the discharge of water of condensation therefrom. The still communicates with the vapor discharge pipe 16, at a point between the valve 17 and the condenser 18, through a vapor return pipe 32 having a controlling valve 33, whereby the turpentine passing with the rosin to the still and separated therefrom may be returned to the condenser 18 and condensed therein.

The collection chamber 5 is in communication with the still 29 through a rosin discharge pipe 34 having a controlling valve 35, through which the rosin, water of condensation from the steam and turpentine contained therewith are drawn off from the extractor into the still, the rosin being finally discharged from the still into a suitable receptacle 36 through a valved outlet 37. A perforated steam injector pipe or coil 38 is arranged within the still and connects with the pipe 14 and is provided with a controlling valve 39. From the tank 20 leads a pipe 40 communicating with a turpentine receiving tank 41 and having a controlling valve 42.

The apparatus having been described, the mode of carrying my improved process into practical effect is as follows: The valves 12 and 15 are first opened and steam supplied to the chambers 4 and 30 to maintain the same at a desired temperature. The valves 24 and 27 are then opened and turpentine permitted to flow from the tank 20 to the spray coil or injector 28. In its flow through the coil 25, the turpentine is heated to a moderate degree, so that as it discharges from the coil 28 and percolates downward through the body of comminuted wood in the cage 6 it will dissolve and leach out the rosin and flow into the collection chamber 5. When the turpentine employed as a solvent has dissolved the rosin, the valve 35 is opened for the discharge of the rosin and turpentine contained therewith, into the still 29, and simultaneously the valve 39 is opened for the supply of steam through the injector 38 into the still. The turpentine in the still is thereby heated and converted into vapor, whereupon the valve 33 is opened for its flow to the condenser 18, in which it is liquefied, the turpentine flowing from the condenser back to the tank 20. As soon as the major portion of the rosin is extracted from the wood, the valve 9 is opened and steam permitted to pass through the perforated pipe 8 throughout the mass of the wood, whereby the turpentine and the remainder of the rosin contained therein are liberated, and the valve 17 is opened to permit flow of the turpentine vapors and steam to the condenser 18, from which the turpentine and water of condensation pass to the tank 20, the water being withdrawn through the pipe 21, while the additional turpentine extracted is discharged from the tank 20 through the pipe 40 to the turpentine receiving tank 41. After the volatile constituents are all extracted from the wood, the valves 9 and 17 are closed, the remainder of the rosin with the water of condensation contained therewith discharged into the still 29 and the valve 35 closed, and the extractor then emptied of the refuse wood and refilled for subsequent use.

It will be understood from the foregoing description that the chamber 4 heated by steam from the boiler or steam generator, maintains an even temperature in the bottom of the extractor and supplements the heating action of the steam discharged through the pipe 8, maintains the rosin in the chamber 5 in a liquefied condition for free discharge, and at the same time heats the coil 25 so that the solvent turpentine supplied to the injector 28 may be raised to a temperature high enough to adapt it to rapidly extract and discharge the turpentine. It will also be seen that as the turpentine and vapors are permitted to have ready discharge, while the mass of wood is heated throughout, condensation of the steam in the wood is retarded and to a large extent prevented, thus enabling the products to be obtained at a low temperature and without the separation of any of the lighter elements of the turpentine into uncondensable gases. A high grade and a greater quantity of turpentine may, therefore, be obtained from a given quantity of wood than is possible by the use of any of the ordinary processes in which it is necessary to employ steam under high heat and pressure, or in which the discharge of the vapors are in any manner retarded. By the use of turpentine as a solvent for the rosin, a natural solvent is employed which may be readily separated from the turpentine vapors without in any manner impairing the quality of the turpentine, as is the case in the use of hydrocarbons and other volatile solvents, the constant use of the turpentine as a solvent or leaching agent on the contrary increasing its purity. As turpentine is the natural solvent of rosin, its use in large quantities is not necessary, and as it is contained at a low temperature in the tank 20 and is heated only to a moderate degree in the coil 25, no loss of turpentine is occasioned, either through its partial conversion into vapor in the storage tank or the heating of its liberated volatile constituents until changed into uncondensable gases, as is common in the case where the turpentine solvent is heated in a large body in a tank prior to use. The process described also enables a large amount of turpentine and rosin to be extracted from a given amount of wood in a quick, convenient and economical manner.

While in the drawing only one extractor is shown, it will of course, be understood that in the process any suitable number of extractors may be employed. It will also be understood that by eliminating the use of hydro-carbons and other foreign agents as solvents, contamination of the turpentine is avoided.

I claim:—

1. The herein described process of separating turpentine and rosin from wood, which consists in supporting a body of wood within a container in spaced relation to the sides and bottom of the container but in communication at all sides therewith, subjecting the wood to the leaching action of moderately heated turpentine allowed to percolate downwardly through the wood, subjecting the bottom of the container and the solvent turpentine passing to the container for use to the action of externally applied heat, so as to evaporate the extracted volatile elements, moderately heat the solvent turpentine and keep the extracted rosin liquefied, collecting the rosin and turpentine in the bottom of the container, raising the temperature of the same in the bottom of the receptacle to a higher degree to vaporize a portion of the turpentine and maintain the rosin in a liquefied condition, separating the unvolatilized turpentine from the rosin for recovering, injecting steam internally at a low temperature and pressure throughout the mass of the wood for the vaporization of the remaining unextracted turpentine and the retained solvent, collecting the turpentine vapor and steam from the space between the body of wood and container and condensing the same, and collecting and separating the rosin, water of condensation and turpentine from the bottom of the container and condensing the resulting turpentine vapor.

2. The herein described process of separating turpentine and rosin from wood, which consists in first subjecting a body of wood to the leaching action of moderately heated turpentine, collecting the rosin and turpentine, raising the temperature of the same to vaporize a portion of the turpentine and maintain the rosin in a liquefied condition, separating the unvolatilized turpentine from the rosin for recovery, then injecting steam throughout the mass of the wood for the vaporization of the contained turpentine and solvent, and collecting and condensing the turpentine vapor and steam and separating the turpentine from the water of condensation.

3. The herein described process of separating turpentine and rosin from wood, which consists in first subjecting the wood to the leaching action of moderately warmed turpentine, collecting the rosin and turpentine, raising the temperature of the same to vaporize a portion of the turpentine and maintain the rosin in a liquefied condition, discharging the unvolatilized turpentine and rosin and separating the same, condensing the turpentine and restoring it to the source of supply, discharging steam throughout the mass of the wood for the extraction of the remainder of the rosin, the turpentine contained therein and the residual solvent, and then collecting and condensing the turpentine and conveying it to said source of supply of the solvent and withdrawing the water of condensation therefrom.

4. The herein described process of separating turpentine and rosin from wood, which consists in subjecting the wood to the leaching action of turpentine drawn from a source of supply and moderately heated at a point between such source and its point of use, collecting the solvent turpentine and rosin, raising the temperature of the same to a point sufficiently high to vaporize a portion of the solvent and keep the rosin liquefied, separating the unvolatilized solvent from the rosin, condensing the turpentine and returning it to the source of supply, heating the mass of wood by injecting steam at a low temperature and pressure throughout the same, collecting and condensing the turpentine vapors and steam, conveying the extracted turpentine to the said source of supply and discharging the water of condensation, and withdrawing from said source of supply the amount of turpentine gained during the extracting operation.

In testimony whereof I affix my signature in presence of two witnesses.

JOHN H. CASTONA.

Witnesses:
T. J. FAIRLEY,
J. J. McCLURE.